May 24, 1966 P. V. N. HELLER 3,252,713
SCOOTER TYPE VEHICLE
Filed June 29, 1964
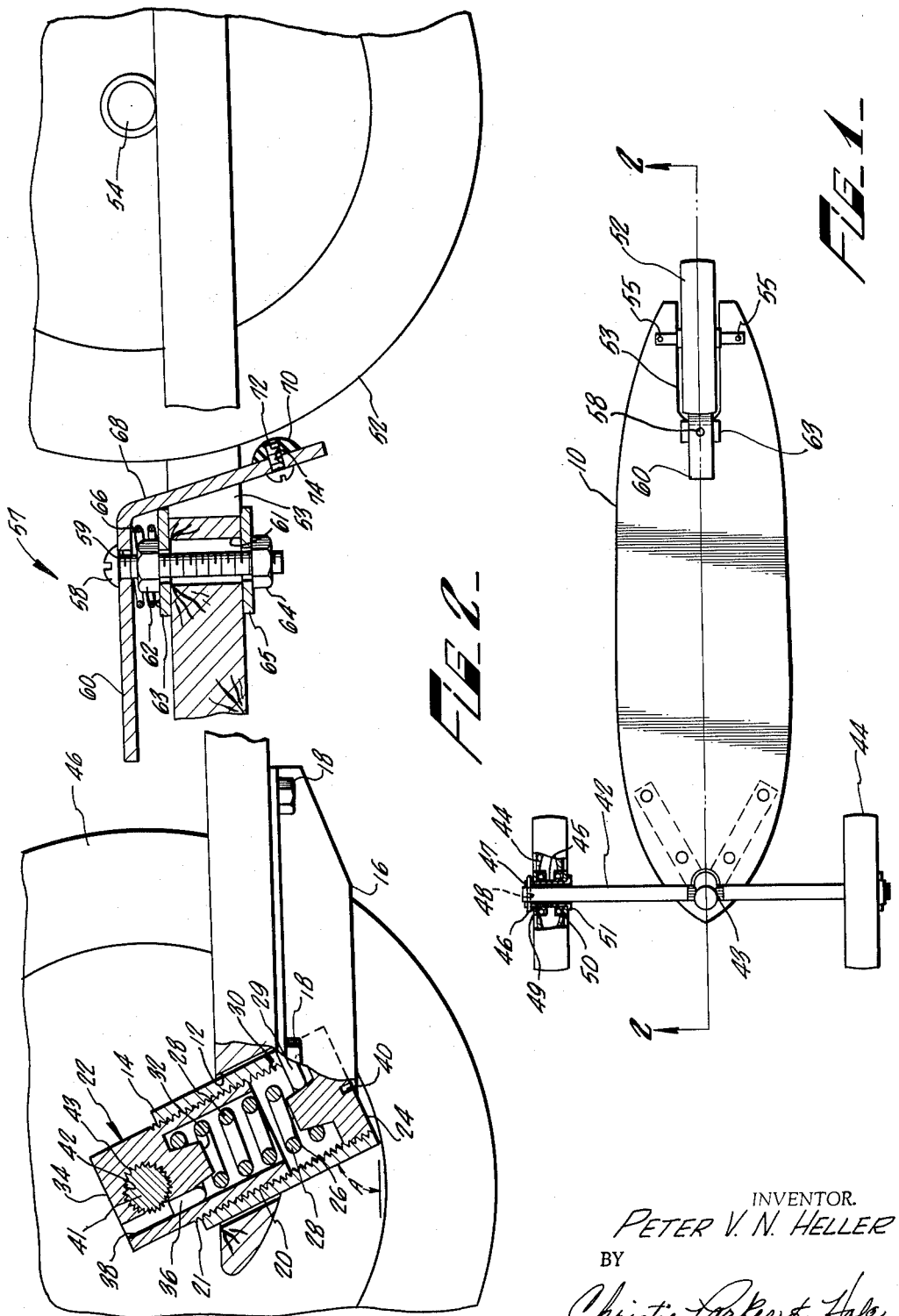
INVENTOR.
PETER V. N. HELLER
BY
Christie, Parker & Hale
ATTORNEY

3,252,713
SCOOTER TYPE VEHICLE
Peter V. N. Heller, P.O. Box 147, Dana Point, Calif.
Filed June 29, 1964, Ser. No. 378,702
8 Claims. (Cl. 280—87.04)

This invention relates to wheeled vehicles of the scooter type and, more particularly, provides a wheeled vehicle which simulates on dry land the action of a surf board or skis.

Surfing has become an increasingly popular sport, but participation in it is limited by weather, wave conditions, and access to the ocean. This invention provides a wheeled vehicle which can be operated by a rider on land to simulate the action of a surf board, and without the restraints imposed by a wave shape. The vehicle is inexpensive, easy to learn to operate, and provides the thrill of surfing and skiing in areas which do not have surf or snow.

The vehicle includes an elongated platform adapted to carry a rider. A pair of rotatable wheels are secured to one end of the platform, and a third rotatable wheel secured to the other end of the platform. Means are provided for turning at least one of the wheels in response to shifting the load of the rider on the platform. In this way, the rider steers the vehicle as the wheels roll by shifting his weight on the platform to cause at least one of the wheels to turn. This control and the resulting response simulate that of surfing and skiing.

Preferably, a pair of rotatable wheels are journalled on an axle which is secured to the platform to pivot about an upright axis, which is inclined to the vertical at an angle from about 55° to about 70°. A brake is provided for the third wheel, which preferably is located on the longitudinal center line of the platform.

In the preferred form, the means for turning the wheels includes a socket secured to the platform, and a pivot sleeve disposed in the socket to rotate about an upright axis. A torsion spring is connected between the pivot socket and sleeve so the sleeve can rotate with respect to the socket but is urged to return to a neutral or straight position by the torsion spring. The axle which carries the pair of rotatable wheels is secured to the pivot sleeve so that as the platform is tilted from the left or right about its longitudinal axis, the axle is turned to steer the wheels.

Preferably, the pivot sleeve is threaded into the socket, and conical guides are provided at each end to fit snugly inside the torsion spring to reduce lost motion or "play" in the steering mechanism. The torsion spring is easily changed so the response of the vehicle can be adjusted for riders of different weight. In the preferred form, the threads between the socket and pivot pin are lubricated by a viscous grease which provides hydraulic damping to further simulate the motion of a surf board on a wave.

These and other aspects of the invention will be more fully understood from the following detailed description and the accompanying drawings, in which:

FIG. 1 is a plan view of the presently preferred embodiment of the vehicle; and

FIG. 2 is a longitudinal sectional view taken on line 2—2 of FIG. 1.

Referring to the drawings, an elongated flat horizontal board or platform 10 has a forwardly and upwardly sloping hole 12 through its forward end to receive an upwardly and forwardly extending hollow socket 14 which is secured at its lower end to a pair of horizontal rearwardly and outwardly extending brackets 16 fastened by screws 18 to the underside of the forward end of the platform.

The socket includes internal threads 20 to receive external threads 21 on a hollow pivot sleeve 22 threaded into the socket. An externally threaded retainer cap 24 is screwed into the lower end of the socket and includes an upwardly extending truncated conical guide 26 which makes a snug fit inside the lower portion of the torsion spring 28. The lower end 29 of the torsion spring extends laterally into a vertical longitudinal retainer slot 30 formed in the lower end of the socket. The upper portion of the torsion spring makes a snug fit around a downwardly extending truncated conical guide 32 formed integrally on the lower surface of a head 34 at the upper end of the pivot sleeve. The upper end 36 of the torsion spring fits in a vertical retainer hole 38 in the pivot sleeve head. A slot 40 in the exposed face of the retainer cap at the lower end of the socket permits the retainer cap to be adjusted to provide the desired amount of compression on the torsion spring to insure a snug fit of the spring against the truncated conical guide at each end. This eliminates lost motion or "play" between the pivot sleeve and the socket.

A transverse horizontal forward axle 41 extends through an axial bore 42 in the pivot head. The center of the axle includes a straight knurled section 43 which is broached into the axial bore 42 in the pivot head to rigidly connect the forward axle to the pivot head. A separate front rotatable rubber-tired wheel 44 is journaled on a separate respective adapter sleeve 45 mounted on each end of the forward axle. A separate respective cotter pin 46 extends through a respective hole 47 in the sleeve and hole 48 at the outer extremity of each end of the axle to hold the sleeve in place. A separate washer 49 is disposed between each cotter pin and the outer surface of the adjacent wheel. Another separate respective washer 50 is disposed between the inner surface of each wheel and a respective adjacent outwardly extending flange 51 formed integrally on the inner end of each wheel sleeve.

The pivot sleeve and socket threads are lubricated by a thick lubricant (not shown), such as Pinion Grease #5, to provide viscous damping between the pivot sleeve and the socket as the pivot sleeve is rotated with respect to the socket in a manner described below. In effect, the sleeve and socket threads, in combination with the viscous lubricant trapped between them, form a long, helical dashpot. The thread geometry also doubles the effective surface area involved in this damping. A square thread (not shown) would further increase the area.

A rotatable rubber-tired rear wheel 52 is mounted in a rearwardly opening longitudinal slot 53 in the center of the rear end of the platform. The wheel is journaled on a rear axle 54 extending across the slot and secured by screws 55 to the platform.

A rear wheel friction brake 57 is secured to the longitudinal center line of the platform at the forward end of the rear wheel slot by a bolt 58 which extends down through an oversized hole 59 in the rear portion of a horizontal and longitudinally extending step lever 60. The lower portion of the bolt 58 extends through an even larger oversized hole 61 in the platform so the position of the brake can be adjusted longitudinally to compensate for tire wear on the rear wheel. An upper nut 62 is threaded onto the bolt 58 and bears down against a washer 63 on the upper surface of the platform. A lower nut 64 is threaded onto the lower end of the bolt and bears against a washer 65 on the bottom surface of the platform. A compression spring 66 is disposed coaxially around the upper nut 62 and bears at its lower end against the upper washer 63 and at its upper end against the undersurface of the horizontal step lever 60. A downwardly and rearwardly extending brake arm 68 formed integrally at its upper end with the rear portion of the step lever is disposed adjacent the forward portion of the rear wheel periphery. The compression spring urges the step lever upwardly against the bolt head to hold the brake arm out of contact with the rear wheel tire except when the step lever is depressed. For increased braking power, a semicircular bar 70 adjacent the rear tire is held on the rear face of the brake arm by a screw 72 disposed through opening 74 in the lower end of the brake arm.

The vehicle can be used in any location where a reasonably smooth surface is available. Alternatively, the vehicle can be supplied with a power unit, such as a gasoline engine, to move it along level terrain or even uphill. Preferably, the vehicle is operated without power and on a slope which provides sufficient speed for testing the rider's skill and maneuvering.

To operate the device, the rider points the vehicle downhill and stands on the platform with his feet about 12 inches apart, facing in a forward direction, but at an angle of about 45° to the longitudinal axis of the vehicle. To turn right, the rider shifts his weight to the right side of the platform so it tends to rotate to the right about its longitudinal axis. The rotation of the socket forces the pivot sleeve and axle to turn to the right and steer the vehicle in that direction. Opposite shifting of the weight turns the vehicle to the left. The torsion spring resists relative turning of the pivot sleeve in the socket, and so does the viscous damping. The compound effect is that the rider has the sensation of some reaction or resistance to his weight in a manner similar to surfing on a conventional surf board. As he returns his weight to the center of the platform, the torsion spring aids in restoring the wheels to the forward position shown in FIG. 1. The torsion spring can easily be changed by removing the retainer cap and replacing the spring with a stronger or weaker one, depending on whether a heavier or lighter rider is to use the vehicle. The angle the socket makes with the horizontal is fairly critical. If it is too low, the edge of the board drags before the forward wheels can make an adequate turn. If the angle is too steep, the front wheel strikes the edge of the board before sufficient turn has been made. I prefer to mount the socket at an angle between about 55° and about 70° to the vertical, an angle of 65° being the best.

Although not entirely critical, the size of the platform controls its preferred performance in simulating skiing and surfing. Ideally, the platform is between 8 and 10 inches wide, a width of 8¾ inches being preferred. The platform is between 29 and 36 inches long, 32 inches being preferred. The platform may be of any suitable material. At the present time, I prefer to manufacture it from ½ inch exterior plywood board with a decorative birch or mahogany veneer on its upper surface. The wheels are preferably rubber-tired, and are about 8 inches in diameter, the distance between the front wheels being about 16 inches center-to-center.

The vehicle can be used competitively in many different ways. Ideally, a standardized slalom course is set up, and participants test their skill against the clock and against each other in making runs on the course.

I claim:
1. A vehicle comprising an elongated platform adapted to carry a load, a socket secured to the platform, a pivot sleeve mounted on the socket to pivot about an upwardly and longitudinally inclined axis, a spring connected between the pivot sleeve and the socket to resist relative movement of the sleeve and socket, an axle connected to the pivot sleeve, a pair of rotatable wheels secured to the axle, and a third rotatable wheel secured to the other end of the platform.

2. A vehicle comprising an elongated platform adapted to carry a load, a socket secured to the platform, a pivot sleeve mounted on the socket to pivot about an upwardly and longitudinally inclined axis, a torsion spring disposed coaxially around the axis and anchored to the sleeve and socket to resist relative movement between them, an axle connected to the pivot sleeve, a pair of rotatable wheels secured to the axle, and a third rotatable wheel secured to the other end of the platform.

3. A vehicle comprising an elongated platform adapted to carry a load, a socket secured to the platform, a pivot sleeve mounted on the socket to pivot about an upwardly and longitudinally inclined axis, a coiled torsion spring disposed coaxially around the axis and anchored to the sleeve and socket to resist relative movement between them, a conical guide extending from the sleeve into the spring to restrain it, an axle connected to the pivot sleeve, a pair of rotatable wheels secured to the axle, and a third rotatable wheel secured to the other end of the platform.

4. A vehicle comprising an elongated platform adapted to carry a load, a socket secured to the platform, a pivot sleeve mounted on the socket to pivot about an upwardly and longitudinally inclined axis, a coiled torsion spring disposed coaxially around the axis and anchored to the sleeve and socket to resist relative movement between them, a conical guide extending from the socket into the spring to restrain it, an axle connected to the pivot sleeve, a pair of rotatable wheels secured to the axle, and a third rotatable wheel secured to the other end of the platform.

5. A vehicle comprising an elongated platform adapted to carry a load, a socket secured to the platform, a pivot sleeve mounted on the socket to pivot about an upwardly and longitudinally inclined axis, a coiled torsion spring disposed coaxially around the axis and anchored to the sleeve and socket to resist relative movement between them, a conical guide extending from the sleeve into one end of the spring to restrain it, a conical guide extending from the socket into the other end of the spring to restrain it, an axle connected to the pivot sleeve, a pair of rotatable wheels secured to the axle, and a third rotatable wheel secured to the other end of the platform.

6. A vehicle comprising an elongated platform adapted to carry a load, a threaded socket secured to the platform, a threaded pivot sleeve mated with the threads of the socket, a viscous lubricant on the threads of the socket and sleeve, the sleeve and socket being disposed so the sleeve is rotatable with respect to the socket about an upwardly and longitudinally inclined axis, an axle secured to the pivot sleeve, a pair of rotatable wheels secured to the axle, a third rotatable wheel secured to the platform, and means for turning at least one of the wheels in response to shifting the load on the platform.

7. A vehicle comprising an elongated platform adapted to carry a load, a threaded socket secured to the platform, a threaded pivot sleeve mated with the threads of the socket, the sleeve and socket being disposed so the sleeve is rotatable with respect to the socket about an upwardly and longitudinally inclined axis, an axle secured to the pivot sleeve, a pair of rotatable wheels secured to the axle, a third rotatable wheel secured to the platform, and means for turning at least one of the wheels in response to shifting the load on the platform.

8. A vehicle comprising an elongated platform adapted to carry a load, a socket secured to the platform, a pivot sleeve mounted on the socket to pivot about an upwardly and longitudinally inclined axis, a spring connected between the pivot sleeve and the socket, a viscous lubricant disposed between the sleeve and socket, the lubricant and spring acting to resist relative movement of the sleeve and socket, an axle connected to the pivot sleeve, a pair of rotatable wheels secured to the axle, and a third rotatable wheel secured to the other end of the platform.

References Cited by the Examiner

UNITED STATES PATENTS

| | | | |
|---|---|---|---|
| 1,056,357 | 3/1913 | Murdock | 280—87.04 |
| 1,070,468 | 8/1913 | Henley | 280—87.04 |
| 1,387,091 | 8/1921 | Woolley et al. | 280—87.09 |
| 2,027,254 | 1/1936 | Vogt | 280—87.04 |
| 3,023,022 | 2/1962 | Boyden | 280—87.04 |

FOREIGN PATENTS 699,673   11/1953   Great Britain.

LEO FRIAGLIA, *Primary Examiner.*